United States Patent Office 2,777,177
Patented Jan. 15, 1957

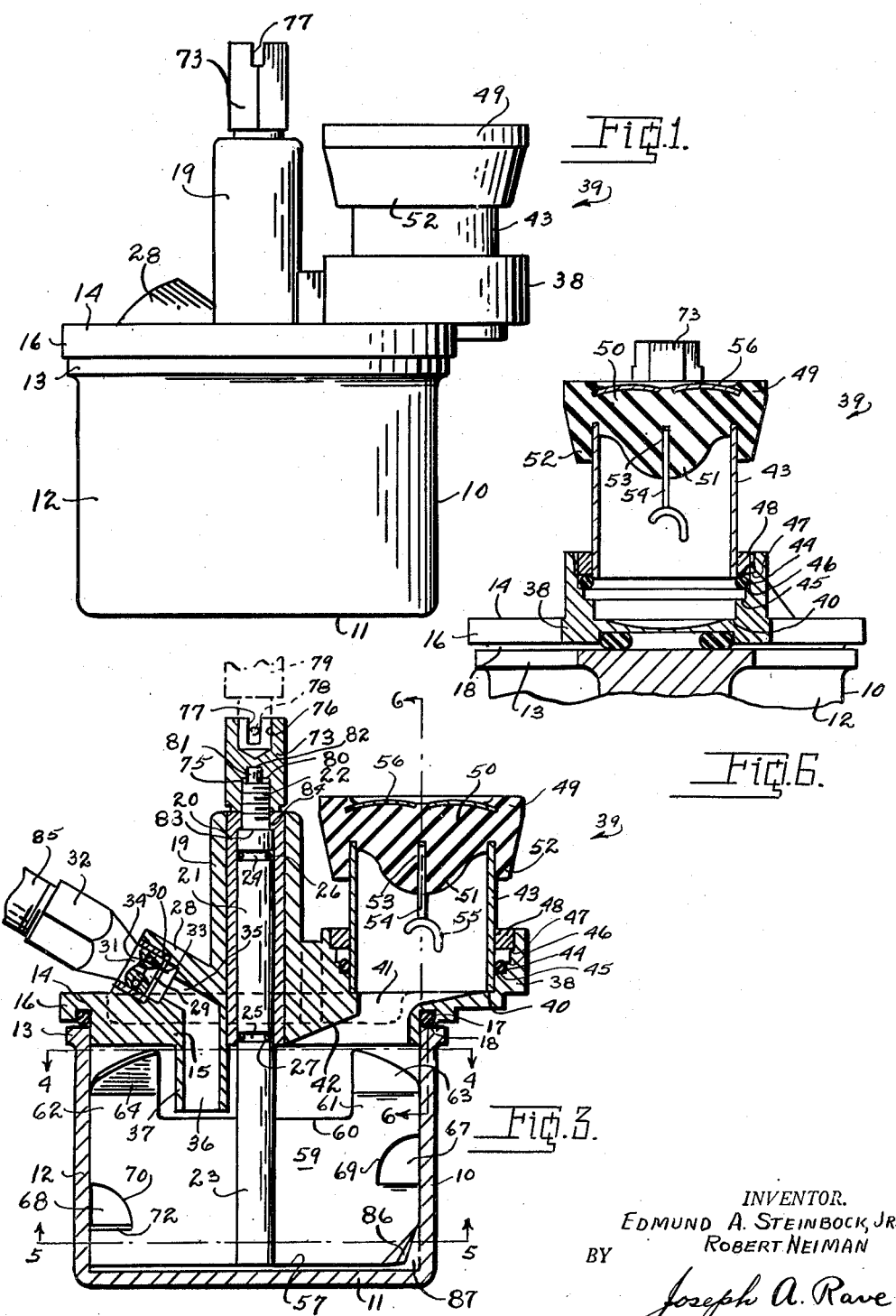

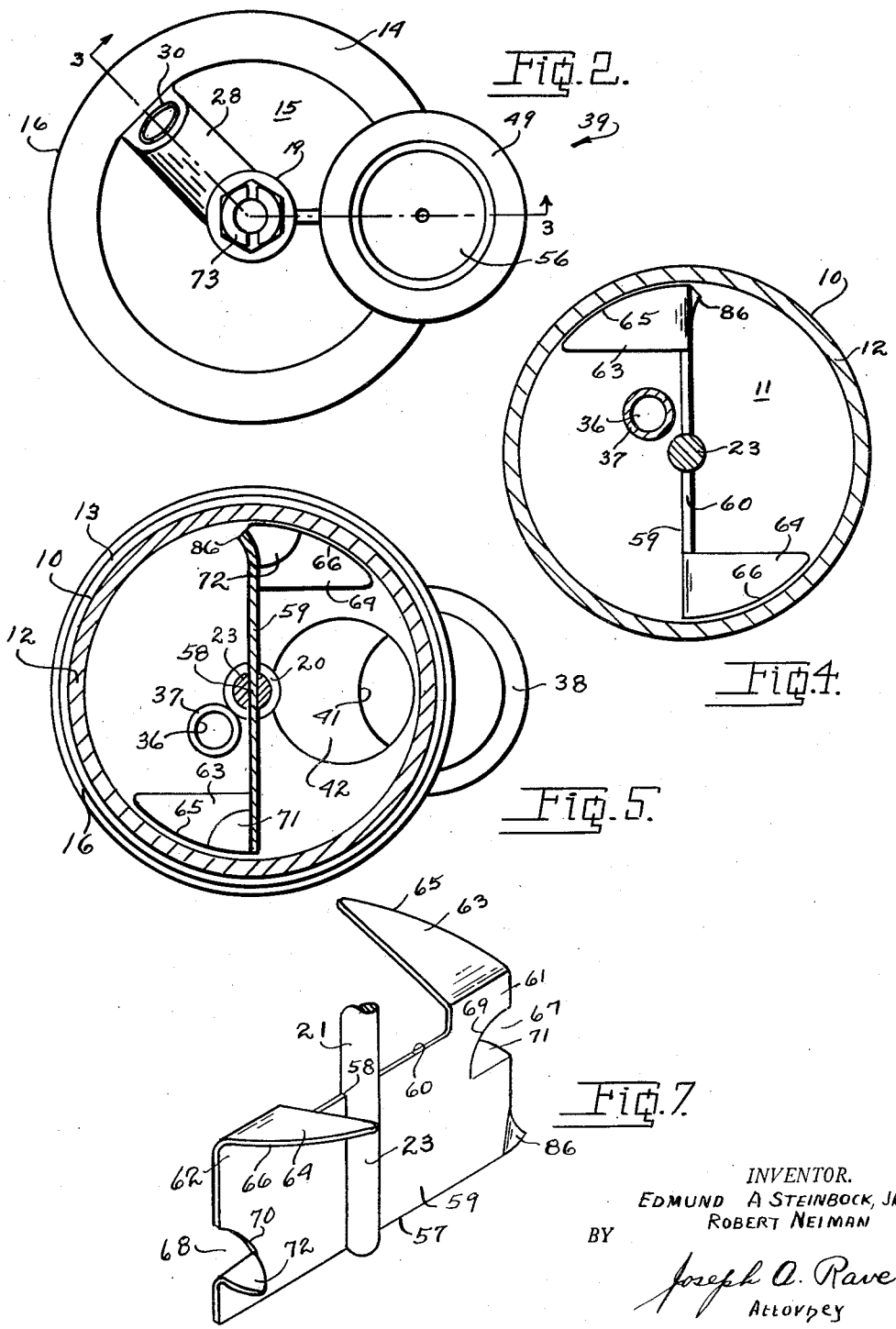

2,777,177
INVESTMENT MIXER

Edmund A. Steinbock, Jr., and Robert Neiman, Louisville, Ky., assignors to Edmund A. Steinbock, Louisville, Ky.

Application November 9, 1951, Serial No. 255,704

7 Claims. (Cl. 22—35)

This invention relates to improvements in an investment mixer and in particular to such a mixer or spatulator in which the mixing or spatulation takes place in a vacuum.

This invention relates to improvements in an investment mixer or spatulator such as that disclosed in pending application of Edmund A. Steinbock, Charles Armbrecht, and Edmund A. Steinbock, Jr., Serial No. 222,372, filed April 23, 1951, for "Investment Mixer," which issued as Patent 2,696,022 on December 7, 1954.

It has been found that certain advantages, particularly when using certain investment compositions, are obtained when the mixing or spatulation of the ingredients is effected at a relatively high rate of speed and these advantages consisting in a smoother extremely creamy mix from which the air can be more readily extracted, and in which the time of mixing is materially reduced. The smoother creamier mix further results in a smoother surface for the mold cavity and a smoother surface on and a more accurate fitting of the resulting casting from said mold cavity.

In order, however, to obtain these advantages a substantially different mechanism is required since the higher rate of speed in mixing resulted, with the mixers or spatulators heretofore known, in clogging of the vacuum mechanism and an unsatisfactory technique.

It is, therefore, the principal object of the present invention to provide an investment mixer or spatulator that will permit of mixing or spatulating at high speed without clogging the mechanism and produce an investment that is extremely smooth and creamy.

Another object of this invention is the provision of an investment mixer or spatulator that accomplishes the foregoing object and in which the ingredients are placed in a vacuum or under sub-atmospheric conditions during the mixing and spatulation thereof.

A further object of this investment is the provision in a vacuum or sub-atmospheric mixer or spatulator of means for inhibiting the clogging or fouling of the vacuum line and therefore the vacuum establishing mechanism.

A still further object of this invention is the provision in a vacuum or sub-atmospheric mixer or spatulator of a mixing paddle or blade that while mixing the ingredients does so in such a manner that entrapped air is readily released and at the same time controls the ingredients being mixed as to the position thereof with respect to the mixer or spatulator container and other parts so as to prevent said ingredients, prior to and while being mixed, from clogging the vacuum line and vacuum establishing mechanism and from being inadvertently discharged from the container.

It is also an object of this invention to provide an investment mixer or spatulator for accomplishing the foregoing objects that is composed of the fewest number of parts and of the simplest design, consistent with the work to be done and results to be accomplished.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawing:

Fig. 1 is a side elevational view of the mixer incorporating the principles of the present investment.

Fig. 2 is a top plan view of the mixer of Fig. 1.

Fig. 3 is a vertical sectional view through the mixer as seen from line 3—3 on Fig. 2.

Fig. 4 is a transverse sectional view through the mixer as seen from line 4—4 on Fig. 3.

Fig. 5 is a transverse sectional view of the mixer of the present invention taken on a plane below that of Fig. 4 on line 5—5 on Fig. 3.

Fig. 6 is a fragmentary, vertical sectional view taken on line 6—6 on Fig. 3.

Fig. 7 is an isometric perspective view of a mixer paddle or blade forming a part of the present invention.

Throughout the several views of the drawings similar reference characters are employed to denote the same or similar parts.

Investment mixers or spatulators as heretofore known have employed a container or bowl having sides and a bottom in which the said sides were convex or substantially truly bowl-shaped. The high speed action of a paddle or mixer blade causes the investment ingredients to ride up the bowl sides and thereby enter and clog the vacuum line as well as cause the said ingredients to be forced against the under surface of the container or bowl cover and not be thoroughly admixed.

By the present invention the said container has been designed and organized to inhibit or limit the rising of the investment ingredients on the container sides and the co-action of the parts is such that the tendency to force the ingredients against the cover is minimized, nor do the said ingredients foul the vacuum line.

As disclosed in the drawings, use is made of a container 10 circular in plan and having a bottom 11 from the perimeter of which extends the container side 12 substantially normal to the bottom. The container 10 is provided with an open top surrounded by an enlarged or radial flange 13 on the upper end of the container side 12.

Disposed on the upper surface of the container radial flange 13 is a cover 14 having a body portion 15 of a diameter substantially equal to the internal diameter of the container 10. At its upper end, the cover 14 is provided with a radial flange 16 that overlies the container radial flange 13. Let into the cover radial flange 16, adjacent to and outwardly of the body portion 15, is a groove 17 into which is disposed a compressible gasket 18, which may conveniently be in the form of, what is commercially known as, an O ring.

Rising substantially centrally of the cover 14 is a cylindrical boss or post 19, centrally bored to have pressed therein a metallic bearing sleeve 20. The bearing sleeve 20 forms the journal for a shaft 21 rotatively journaled therein and having a reduced threaded portion 22 projecting upwardly of the bearing sleeve 20 and having a second portion 23 projecting below the cover 14 to a point substantially adjacent the upper surface of the container bottom 11 when said cover 14 is mounted on the container. The shaft 21 is provided adjacent to the portions 22 and 23 with grooves 24 and 25 into each of which is placed a seal or gasket 26 and 27 and, similar to the gasket 18, may be a commercially available O ring.

To one side of the cylindrical boss or post 19, the cover 14 has upstanding therefrom a second boss 28 provided with a counterbore 29 having its axis conveniently, though not necessarily, at an acute angle to the axis of the bore through the cylindrical boss or post 19. Disposed in the counterbore 29 is a metallic sleeve 30 receiving the reduced end 31 of the vacuum line connecting fitting 32. Formed in the connecting fitting reduced portion 31 is a groove 33 in which is disposed a gasket or O ring 34 for engagement with the sleeve 30 to form an air tight joint.

Extending from the counterbore 29 through the boss or lug 28 and in axial alignment therewith is a passageway or port 35 communicating with a passageway or port 36 formed through a sleeve 37 projecting downwardly from the under surface of the cover body portion 15, with said passageway or port 36 and sleeve 37 having their axes substantially parallel with the axis through the bore in the cylindrical boss or post 19. The port 36 is placed as near as possible at the center of the cover where centrifugal force is at a minimum. Laterally offset from the cylindrical boss or post 19 the cover 14 has upstanding therefrom a boss 38 of such diameter that a portion thereof projects beyond the cover radial flange 16 and therefore beyond the container 10 and adapted to receive and support the mold forming housing or casting ring assembly indicated in its entirety by the reference character 39.

As illustrated and described in the above identified application the boss 38 is provided with a plurality of concentric counterbores each terminating in a seat with the innermost counterbore terminating in the seat 40 forming the base of the counterbores and through which is formed a passageway or bore 41 into the interior of the container 10. The said passageway 41 through the body portion 15 of the cover 14, simulates an inverted funnel, as at 42, and acts as a funnel for a purpose subsequently to be made clear. Disposed within the counterbore and resting on the counterbore lowermost seat or base 40 is one end of a casting ring or mold forming housing 43 of the mold forming assembly, above identified by the reference character 39.

The casting ring or mold forming housing 43 is sealed against air leakage in the counterbore by an O ring 44, but since the casting ring or mold forming housing 43 is of considerable diameter the positioning of the O ring presented a problem for conveniently inserting and withdrawing the casting ring or mold forming housing with respect to the said counterbore. In order to effect this operation the boss 38 is provided with, as noted above, a plurality of concentric counterbores each of which terminates in a seat which may be designated as a lower intermediate seat 45, an upper intermediate seat 46 and an uppermost seat 47. Disposed within the counterbore and on the upper intermediate seat 46 is, the normal position of, the O ring 44, see Fig. 6. The casting ring or mold forming housing 43 is initially brought into engagement with the O ring 44 when on the seat 46, as seen in Fig. 6, and the casting ring or mold forming housing is then, as will later be made clear, projected through the O ring to the seat 45, thereby causing the O ring 44 to be rolled to its sealing position and onto the lower intermediate seat 45 and compressed between the outer surface of the casting ring or mold forming housing and the inner surface of the counterbore as clearly illustrated in Fig. 3. To prevent the displacement of the O ring 44 from the counterbore, the said counterbore is closed by a guide ring 48 disposed in the counterbore on the uppermost seat 47. The guide ring 48 has an aperture therethrough to guide the casting ring or mold forming housing to initially place it against the O ring 44 and guide the same during its movements to the seat 39.

The mold forming assembly is completed by having secured to its uppermost or free end a sprue former carrier 49 which, in the main, is formed of rubber or other flexible material. The sprue former carrier 49 is provided with a body portion 50 centrally of which is an enlarged portion 51 that forms, in the mold, the crucible. Outwardly of the protuberance 51 the sprue former carrier is provided with a flange 52 that engages the outer surface of the casting ring or mold forming housing 43. Substantially, centrally of the protuberance 51 there is provided a socket 53 in which is disposed the sprue former or pin 54 that carries at its free end the pattern 55. Let into the bottom or base of the sprue former carrier 49 is a metal plate 56 which prevents distortion of the sprue former carrier when under sub-atmospheric conditions, as will subsequently be made clear.

Disposed on the portion 23 of the shaft 21 is a paddle or mixing blade 57 with said parts connected to one another in any suitable or desirable manner. As shown, for example, in Fig. 5, the method of securing the parts to one another consist in slotting the shaft portion 23 substantially centrally thereof as at 58 for a distance corresponding to the height of the body portion 59 of the blade or paddle. As illustrated in Figs. 3 and 5 the blade or mixing paddle body portion 59 is of a width substantially equal to the interior or transverse diameter of the container and upstands at its outer edge to a point somewhat below the under surface of the cover 14. Intermediate the ends of the body portion, at its upper end, it is cut back or relieved as at 60, and thereby providing the blade or paddle with upwardly projecting arms 61 and 62. Integral with and angularly disposed with respect to said arms 61 and 62 are fingers 63 and 64 respectively carried by the said arms 61 and 62. The fingers 63 and 64 have their outer edges arcuately formed, as at, respectively 65 and 66, to conform with the internal diameter of the container 10. The said fingers 63 and 64 in addition to being bent to an outward angle to the mixing paddle or blade body 59 also upwardly incline so that free ends or points are adjacent to the undersurface of the cover 15.

It will be noted, particularly from Fig. 7, that the fingers 63 and 64 respectively extend in opposite direction with respect to the body portion 59. The blade or body portion 59 inwardly of each of its opposite edges and in planes above one another is provided with a notch 67 and 68 each formed by a slit into the said body portion 59, preferably an arcuate slit as at 69 and 70, with the material of the said body portion defined by the said slits bent to be substantially at right angles to the said body portion and thereby form lugs 71 and 72 which project in the same direction and underlie the fingers 63 and 64 at the upper end of the paddle or blade body portion.

Mounted on the reduced threaded portion 22 of the shaft 21 is a driver 73 for connection with a driving shaft, motor shaft, or the like, whereby the said shaft 21 is driven. The driver 73 may take any desired or necessary form, that shown in the drawings comprising a length of hexagonal stock 74 provided at one end with an internally threaded socket 75 to be screwed onto the said reduced threaded portion 22 of the shaft 21. The driver 73 is provided in its other end with a socket 76 transversely of which is formed a kerf or slot 77 to receive the driving pin 78 adjacent the end of the driving shaft, motor shaft, or the like 79.

The shaft driver 73, in addition, acts as a nut for securing the shaft 21 in operative position in the cover cylindrical boss 19 by being screwed home until the base 80 of its threaded socket 75 engages the end of the shaft reduced threaded portion 22 or until the end of the tit 81 engages the bottom of a reduced counterbore 82 beyond the threaded socket base 80. The shaft driver 73 thereby prevents axial movement of the shaft 21 downwardly, as seen in Fig. 3, and axial movement of the shaft upwardly is prevented by the engagement of the shaft shoulder 83, at the base of the shaft reduced threaded portion 22, with an inwardly projecting radial flange 84 at the upper end of the bearing sleeve 26.

In practice, the ingredients to be mixed, plaster of Paris, or the like, water, accelerators, retarders, and other desirable ingredients, are disposed in the container 10 and are then hand spatulated or not, as desired, whereupon the top or cover 14 is placed on the container for closing the same. The reason for hand spatulation is to wet down the dry ingredients and prevent withdrawal thereof by the vacuum pump or motor. The casting assembly is now mounted in position by inserting the end of the casting ring or mold forming housing 43 through the guide ring 48 into engagement with the O ring or gasket 44 as above set forth and as illustrated in Fig. 6 of the drawings.

At this time the vacuum line connection 32, at the end of the vacuum line or conduit 85, is inserted into the sleeve 30 whereupon the vacuum creating machine, pump, or aspirator is set in operation for creating a vacuum in the line 85 and reducing the interior of the container and parts connected therewith to a sub-atmospheric pressure.

It should be noted that, at present, the container 10 and the cover 14 are preferably formed of clear plastic material, wherefore the bores in the cylindrical boss or post 19 and in the angularly extending boss 28 are noted as having secured therein "metallic" sleeves. It should be noted that these parts, container and cover, may be made of any suitable or desirable material and if they are formed of materials that provide acceptable bearing surfaces the sleeves 20 and 30 may be dispensed with unless the said sleeves are desired for subsequent replacement in the event of wear.

The creation of a sub-atmospheric condition in the container 10 and mold forming assembly 39 causes the cover 14 to be drawn onto the container with such force as to compress the gasket or O ring 18 to form an air tight joint between these parts, and at the same time draws the casting assembly to its final position on the counterbore seat 40, or from the position in Fig. 6 to the position in Fig. 3.

At this time the shaft 21 is connected with the driving shaft 79 through the driver 73 for effecting the rotation thereof and the rotation of the mixing paddle or blade in a counterclockwise direction, as seen, for example, in Fig. 4. The rate of rotation of the shaft 21 and therefore the mixing paddle or blade 57 connected therewith is at a relatively high speed wherefore the said mixing paddle or blade 57, through centrifugal force, throws the ingredients toward the wall 12 of the container 10. It will be appreciated that this could result in the ingredients in the container being packed against the edges of the mixing blade or paddle and merely being pushed around the interior of the container without effecting a thorough admixing of the said ingredients. At the same time the ingredients would have the tendency, due to the sub-atmospheric condition existing in the container, to move toward the source of creation of said sub-atmospheric condition. At the same time the ingredients being packed at the ends of the mixing paddle or blade may not give up any entrapped air.

In order to prevent these conditions from prevailing and to insure thorough admixing of the ingredients, the said ingredients are broken up into ribbon-like layers for thereby releasing any entrapped air in the mass and the ingredients are forced vertically of the container side for effecting the thorough admixing thereof. The ingredients or mass is broken into layers of ribbon-like widths by the notches 67 and 68 in the lateral ends of the mixing paddle or blade with said layers being definitely established by the lugs 71 and 72 which cause a downward forcing of the material caught thereunder and a forward rolling and pushing of the material lying adjacent the mixing paddle or blade immediately beneath said lugs. This churning of the material or mass in these ribbon-like layers causes the material to tend to rise to the top of the container and which rise is prevented by the upwardly forwardly inclined fingers 63 and 64 which in turn force the material downwardly to admix with the material tending to rise upwardly from the container bottom. At the same time these fingers 63 and 64 will remove from the undersurface of the cover body 15 any material that rises thereto in advance of the said fingers 63 and 64.

The breaking up of the material within the container, while being mixed, into ribbon-like layers releases any entrapped air which is immediately drawn into the vacuum line 85. Since, as noted above, the ingredients and material while being mixed are substantially adjacent the side 12 of the container, the center of the container is free of any material, and being at a pressure substantially below atmospheric pressure it will draw thereinto the released air from the material and exhaust same through the sleeve 37.

After the material has been thoroughly admixed, the rotation of the mixer paddle or blade is stopped and the spatulated material discharged from the container into the mold forming assembly 39 through the funnel 42 and passageway 41 in the cover body portion. This is accomplished by turning over the mixer on an axis transversely of its longitudinal axis until the sprue former carrier 49 is in engagement with a vibrator. It will be appreciated that certain of the mixed material may move across the surface of the cover to the funnel 42 and which material is prevented from entering or fouling the vacuum line or conduit 85 by the sleeve 37.

It should be noted that the sleeve 37 will also prevent the entering of any material into the vacuum line or conduit 85 during the normal operation of the mixer which is generally accomplished with the axis of the mixer shaft 21 disposed in a horizontal plane while in engagement with the mixer driving shaft 79. It is to accommodate the sleeve 37 that the mixing paddle or blade body portion 59 is relieved or downwardly formed as at 60.

It has been found, that if the ingredients are not fairly evenly distributed on opposite sides of the mixing paddle or blade body portion 59 the mechanism has a tendency to vibrate when the mixing paddle or blade is rotated due to the greater amount of material or weight on the said one side. By relieving one corner of the body of the mixing paddle or blade this vibration is eliminated since such a relief will allow the ingredients below the side edge notches 67 and 68 to shift and thereby establish a substantial balance of distribution of the ingredients on both sides of the blade or mixing paddle.

This relieving on the mixing paddle or blade may be accomplished by cutting away the corner, but preferably, and as seen in the drawing, is effected by bending the corner, as illustrated at 86. The corner 86 is preferably bent in the opposite direction to that in which the mixing paddle or blade is driven, that is, the corner 86 is bent toward the observer as seen in Fig. 7. This construction result, in effect, of providing a notch in the mixing paddle or blade at the corner thereof, or in a passageway between the mixing paddle or blade and the container, as at 87 in Fig. 3.

What is claimed is:

1. In a device of the class described the combination of a mixing container having a cylindrical body portion open at its top and provided with a bottom substantially normal thereto, a cover for the container open top, a mixing paddle within the container having a body portion of a length substantially equal to the transverse dimension of the container and a height upstanding from the bottom to a point below the undersurface of the cover, said paddle having a normal top edge and its sides substantially adjacent the container body portion and its lower edge substantially adjacent the container bottom with its top edge below the container top, a shaft rotatably supported by the cover connected with the mixing paddle, means carried by the shaft for connecting same with a driver, means including a port through the cover for connecting the interior of the mixing container with a device for creating a subatmospheric condition within the container, a sleeve depending from the cover laterally offset from the shaft and centrally bored in axial alignment with the port in the cover and with said sleeve depending to a point below the top edge of the paddle body portion, said container cover having a discharge opening therethrough, a mold forming housing operatively associated with said discharge opening, and said paddle body portion having a cut-out portion in its upper top edge to clear the sleeve upon rotation.

2. In a device of the class described the combination of a mixing container having a cylindrical body portion open at its top and provided with a bottom substantially normal thereto, a cover for the container open top, a mixing paddle within the container having a body portion of a length substantially equal to the transverse dimension of the container and a height upstanding from the bottom to a point below the undersurface of the cover, said paddle having a normal top edge and its sides substantially adjacent the container body portion and its lower edge substantially adjacent the container bottom with its top edge below the container top, a shaft rotatably supported by the cover connected with the mixing paddle, means carried by the shaft for connecting same with a driver, means including a port through the cover for connecting the interior of the mixing container with a device for creating a subatmospheric condition within the container, a sleeve depending from the cover laterally offset from the shaft and centrally bored in axial alignment with the port in the cover and with said sleeve depending to a point below the top edge of the paddle body portion, said container cover having a discharge opening therethrough, a mold forming housing operatively associated with said discharge opening, said paddle body portion having a cut-out portion in its upper top edge to clear the sleeve upon rotation, and upwardly, forwardly inclined fingers on the top edge of the mixing paddle body portion outwardly of the cover depending sleeve.

3. In a device of the class described the combination of a mixing container having a cylindrical body portion open at its top and provided with a bottom substantially normal thereto, a cover for the container open top, a mixing paddle within the container having a body portion of a length substantially equal to the transverse dimension of the container and a height upstanding from the bottom to a point below the undersurface of the cover, said paddle having a normal top edge and its sides substantially adjacent the container body portion and its lower edge substantially adjacent the container bottom with its top edge below the container top, a shaft rotatably supported by the cover connected with the mixing paddle, means carried by the shaft for connecting same with a driver, means including a port through the cover for connecting the interior of the mixing container with a device for creating a subatmospheric condition within the container, a sleeve depending from the cover laterally offset from the shaft and centrally bored in axial alignment with the port in the cover and with said sleeve depending to a point below the top edge of the paddle body portion, said container cover having a discharge opening therethrough, a mold forming housing operatively associated with said discharge opening, said paddle body portion having a cut-out portion in its upper top edge to clear the sleeve upon rotation, upwardly, forwardly inclined fingers on the top edge of the mixing paddle body portion outwardly of the cover depending sleeve, and said mixing paddle being provided in its sides with notches located between the fingers and the bottom edge of the paddle body portion.

4. In a device of the class described the combination of a mixing container having a cylindrical body portion open at its top and provided with a bottom substantially normal thereto, a cover for the container open top, a mixing paddle within the container having a body portion of a length substantially equal to the transverse dimension of the container and a height upstanding from the bottom to a point below the undersurface of the cover, said paddle having a normal top edge and its sides substantially adjacent the container body portion and its lower edge substantially adjacent the container bottom with its top edge below the container top, a shaft rotatably supported by the cover connected with the mixing paddle, means carried by the shaft for connecting same with a driver, means including a port through the cover for connecting the interior of the mixing container with a device for creating a subatmospheric condition within the container, a sleeve depending from the cover laterally offset from the shaft and centrally bored in axial alignment with the port in the cover and with said sleeve depending to a point below the top edge of the paddle body portion, said container cover having a discharge opening therethrough, a mold forming housing operatively associated with said discharge opening, said paddle body portion having a cut-out portion in its upper top edge to clear the sleeve upon rotation, upwardly, forwardly inclined fingers on the top edge of the mixing paddle body portion outwardly of the cover depending sleeve, said mixing paddle being provided in its sides with notches located between the fingers and the bottom edge of the paddle body portion, with said notches located in planes one above the other, and a lug forwardly projecting from the base of each notch at an angle to the mixing paddle body portion.

5. As an article of manufacture a mixing paddle or blade for use in an investment mixer comprising a substantially cylindrical container including a bottom and upstanding sides, and a mixing paddle or blade having a substantially rectangular body portion with its upper and lower edges substantially parallel to one another and with its side edges substantially parallel to one another and at right-angles to the upper and lower edges and a notch formed in each side edge of the body portion between its upper and lower edges with each notch in a plane parallel with but spaced from the other for dividing the investment into layers alternately movable within the container upon rotation of the mixing paddle.

6. As an article of manufacture a mixing paddle or blade for use in an investment mixer comprising a substantially cylindrical container including a bottom and upstanding sides, and a mixing paddle or blade having a substantially rectangular body portion with its upper and lower edges substantially parallel to one another and with its side edges substantially parallel to one another and at right-angles to the upper and lower edges, a notch formed in each side edge of the body portion between its upper and lower edges with each notch in a plane parallel with but spaced from the other for dividing the investment into layers alternately movable within the container upon rotation of the mixing paddle, and scrapers in the form of fingers upwardly and forwardly inclined from the upper edge of the mixing paddle body portion.

7. As an article of manufacture a mixing paddle or blade for use in an investment mixer comprising a substantially cylindrical container including a bottom and upstanding sides, and a mixing paddle or blade having a substantially rectangular body portion with its upper and lower edges substantially parallel to one another and with its side edges substantially parallel to one another and at right-angles to the upper and lower edges, a notch formed in each side edge of the body portion between its upper and lower edges with each notch in a plane parallel with but spaced from the other for dividing the investment into layers alternately movable within the container upon rotation of the mixing paddle, scrapers in the form of fingers upwardly and forwardly inclined from the upper edge of the mixing paddle body portion, and said body portion having one corner at the bottom thereof outwardly bent to permit the transfer of investment from one side of the body portion to the other when in use.

References Cited in the file of this patent

UNITED STATES PATENTS

| | | | |
|---|---|---|---|
| 195,019 | Jones | Sept. 11, | 1877 |
| 644,649 | Walter | Mar. 6, | 1900 |
| 657,611 | Northcutt | Sept. 11, | 1900 |
| 1,224,798 | Saxe | May 1, | 1917 |
| 1,281,610 | Lundahl | Oct. 15, | 1918 |
| 1,325,004 | Davidson | Dec. 16, | 1919 |
| 1,467,956 | Stark | Sept. 11, | 1923 |
| 2,392,731 | Fox | Jan. 8, | 1946 |
| 2,453,914 | Hollenbeck | Nov. 16, | 1948 |
| 2,490,193 | Barr | Dec. 6, | 1949 |
| 2,696,022 | Steinbock et al. | Dec. 7, | 1954 |